Inventor
Paul E. Hawkinson
By his Attorneys
Merchant and Kilgore

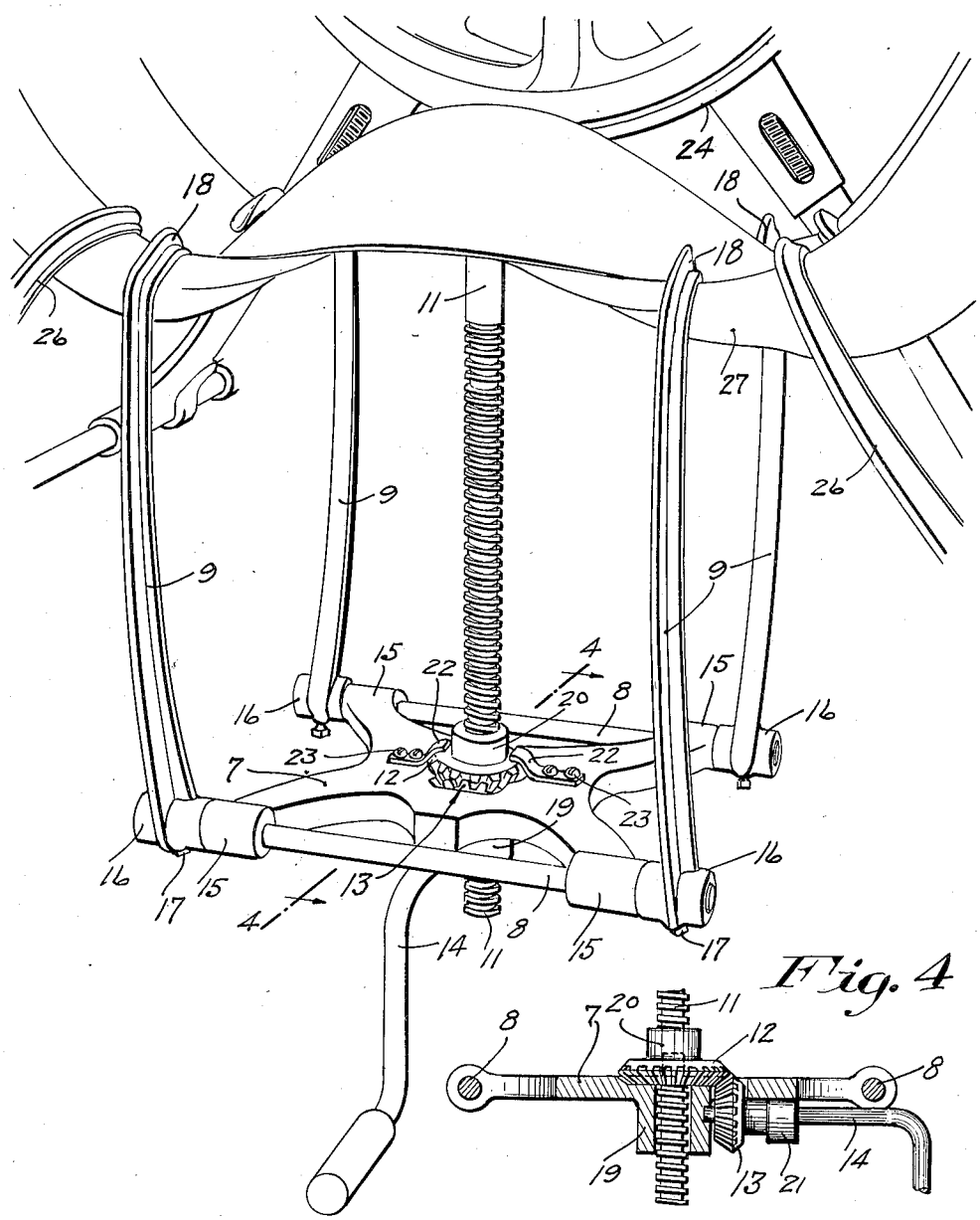

Patented Aug. 19, 1924.

1,505,141

UNITED STATES PATENT OFFICE.

PAUL E. HAWKINSON, OF MINNEAPOLIS, MINNESOTA, ASSIGNOR TO KEHAWKE MANUFACTURING CO., OF MINNEAPOLIS, MINNESOTA, A CORPORATION OF MINNESOTA.

COMBINED TIRE-CASING TURNER AND WORK SUPPORT.

Application filed February 1, 1923. Serial No. 616,284.

*To all whom it may concern:*

Be it known that I, PAUL E. HAWKINSON, a citizen of the United States, residing at Minneapolis, in the county of Hennepin and State of Minnesota, have invented certain new and useful Improvements in Combined Tire-Casing Turners and Work Supports; and I do hereby declare the following to be a full, clear, and exact description of the invention, such as will enable others skilled in the art to which it appertains to make and use the same.

My present invention relates to a combined tire casing turner and work support for use in repairing pneumatic tire casings. While said invention is intended for general use it is especially adapted for use in carrying out my improved process of repairing pneumatic tires, which includes an improved patch without corners, disclosed and broadly claimed in my U. S. Letters Patent #1,436,394, of date November 21, 1922, and also for use in connection with my improved "tire casing holder and spreader" and "tire casing spreader," disclosed and broadly claimed in my U. S. Letters Patent of date September 14, 1920, #1,352,601 and #1,352,807, respectively.

In carrying out the improved process above referred to, all of the repair work must be done on the inside of the tire casing, and which process first requires the selection of one of the patches, heretofore referred to, of the required number of plies and size and having the same curvature both circumferentially and transversely as the tire casing. The number of plies of the selected patch usually corresponds to about one-half of the number of plies in the tire casing being repaired, and the size of the patch must be such as to cover the mutilated portion of the tire casing and extend well onto the body thereof completely around the mutilated portion which may have been caused in various different ways, such as by a puncture or blow out.

After the selection of such a patch or pattern thereof, the same is laid on the inside of the tire casing over the mutilated portion thereof and said casing marked around the edge of the patch or pattern with a pencil or the like to indicate the portion of the tire casing to be cut away to receive the patch. While the tire casing is thus being marked, it is highly important that the sides thereof are not sufficiently spread to distort the natural form of the body of the tire casing for the reason that an opening must be made in the tire casing in which the patch will closely fit when the tire casing is in its normal form, and in which said patch when cemented in position will be free from strain so that the work will stand up.

In cutting away the tire casing to receive the patch, it is necessary to spread the sides of the tire casing to give sufficient working room, and for this purpose the improved tire spreader above referred to is highly serviceable and also affords a support for the tire casing to hold the same in a convenient position for the workman.

To further facilitate the work in cutting away a portion of the tire casing it is highly desirable to turn a section of said casing, where the repair is being made, inside out, and to do this I provide the combined tire casing turner and work support above referred to and which is the subject matter of my present invention.

To such ends, the invention consists of the novel devices and combinations of devices hereinafter described and defined in the claims.

In the accompanying drawings, which illustrate the invention, like characters indicate like parts throughout the several views.

Referring to the drawings:

Fig. 3 is a view corresponding to Fig. 2 but on an enlarged scale, with some parts broken away and the combined tire casing spreader and work support projected to turn a section of the tire casing inside out;

Fig. 4 is a detail view partly in elevation and partly in section taken on the line 4—4 of Fig. 3;

Figure 1:
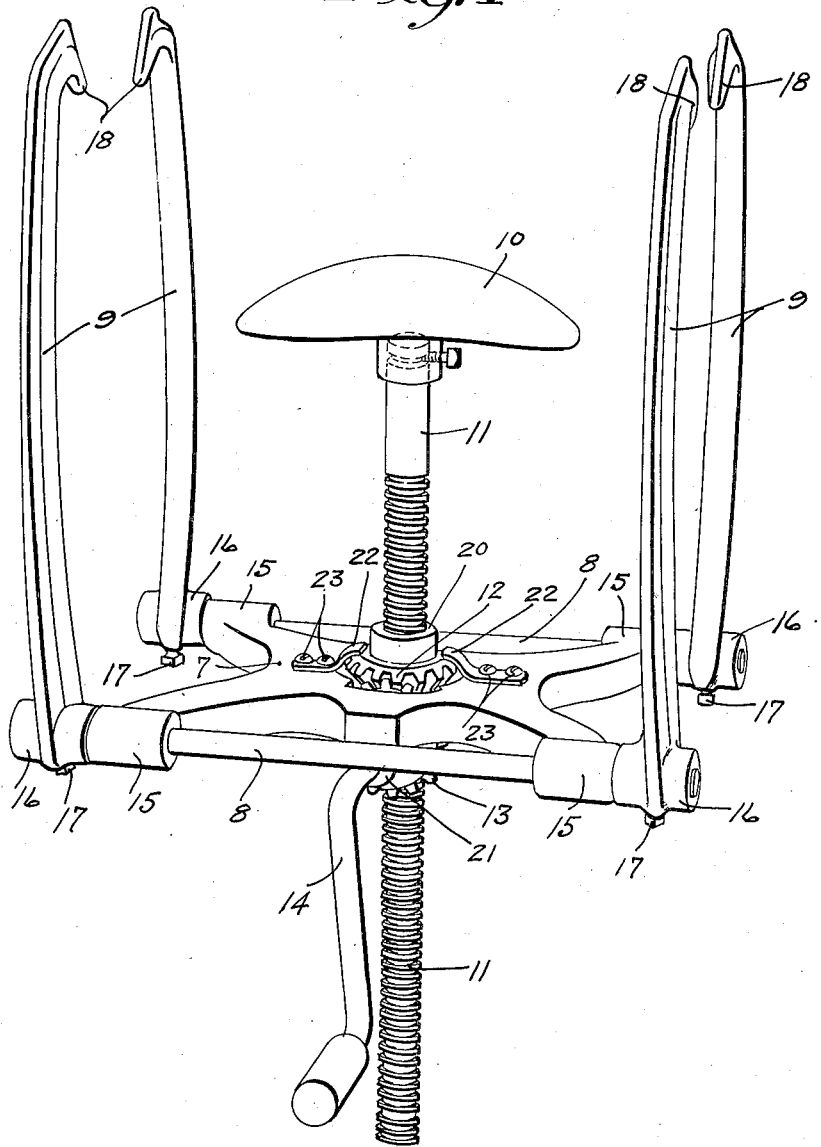
Fig. 1 is a perspective view of the combined tire casing turner and work support.

The improved combined tire casing turner and work support comprises a body plate 7, a pair of parallel rock shafts 8, two pairs of grapple arms 9, a head 10, a screw shaft 11, a pair of intermeshing bevel gears 12 and 13, and a hand crank-equipped shaft 14. Formed with the body plate 7 at the four corners thereof are aligned pairs of bearing sleeves 15 in which the rock shafts 8 are mounted. On the inner ends of the grapple arms 9 are hubs 16 through which the rock shafts 8 project outward of the sleeve bearings 15, and which hubs are rigidly secured thereto by set screws 17 whereby, under the turning movement of said rock shafts, the two pairs of grapple arms 9 may be swung toward and from each other. On the outer ends of the grapple arms 9 are inturned hooks 18 adapted to engage the beads on the sides of a tire casing and anchor the body plate 7 thereto. The screw shaft 11 is loosely mounted to turn and travel endwise through a depending sleeve 19 formed on the bottom of the body plate 7 at the central portion thereof.

Figure 2:
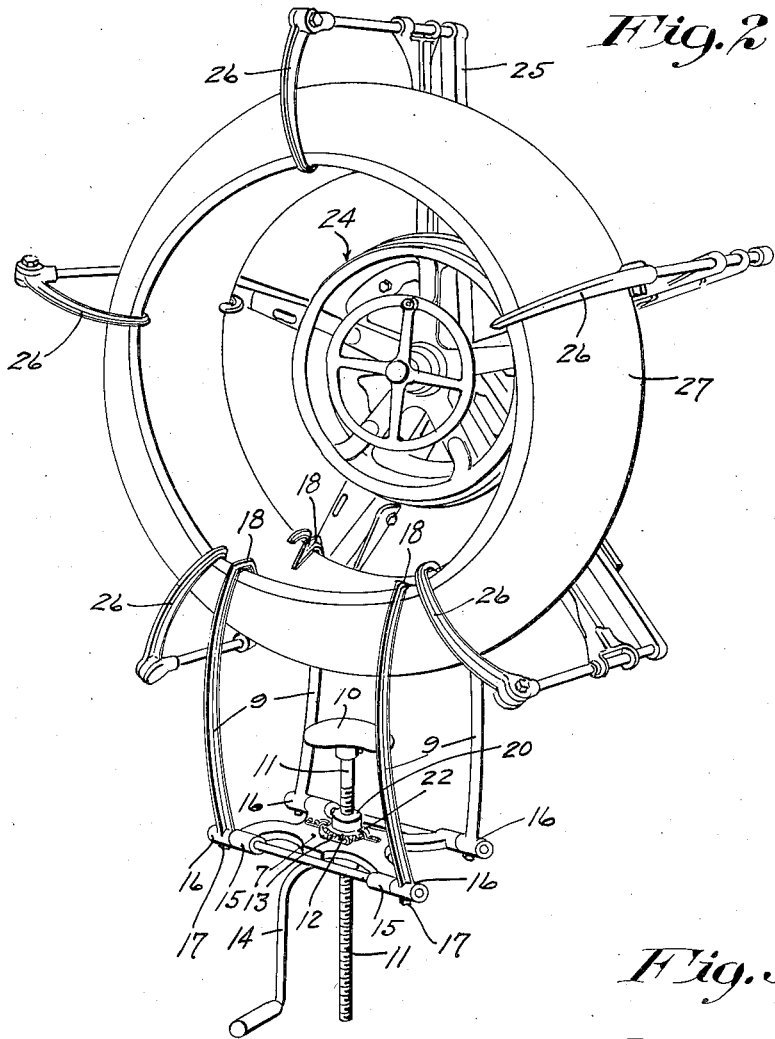
Fig. 2 is a perspective view of the combined tire casing turner and work support retracted and held suspended from a tire casing which in turn is mounted on a tire spreader adjusted to spread the sides of the tire casing.
Figure 5:
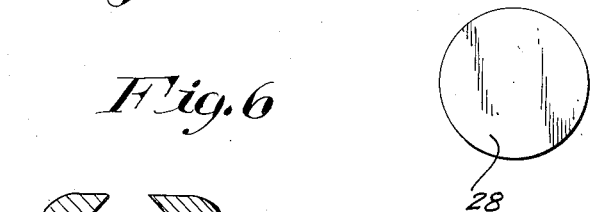
Fig. 5 is a plan view of a pattern of a tire patch.
Figure 6:
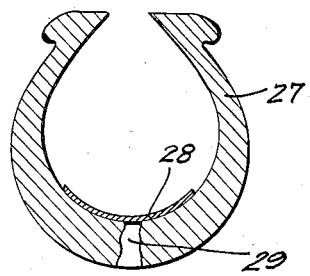
Fig. 6 is a view principally in section showing the pattern placed on the inside of a tire casing over the mutilated portion thereof which is to be cut away to receive a patch.

The hub of the gear 12 affords a nut 20 which has screw-threaded engagement with the screw shaft 11. The shaft 14 extends transversely of the rock shaft 8 and is journaled in a bearing 21 on the bottom of the body plate 7 and in a seat formed in the sleeve 19. The gear 13 is secured to the shaft 14 for rotation therewith, and the gear 12 which meshes therewith is mounted in a recess formed in the top of the body plate 7 and is held against axial movement between the sleeve 19 and a pair of diametrically opposite retaining fingers 22 which loosely overlap said gear and are secured by screws 23 to the top of the body plate 7. When the tire casing turner and work support is attached to the tire casing by its grapple arms 9, the screw shaft 11 is positioned to move radially in respect thereto under the endwise movement imparted to said shaft by the nut 20 under the action of the gears 12 and 13 and hand crank-equipped shaft 14, as best shown in Fig. 2.

The head 10, which is convex, is attached to the upper end of the screw shaft 11 for engagement with the tread surface of the tire casing, and when brought into engagement therewith, will turn a section of the tire casing, between the grapple arms 9, inside out, as shown in Fig. 3. This turning of a section of the tire casing inside out greatly distorts the line marked thereon, but by cutting the inner ply of the tire casing on said line and then successively correspondingly cutting underlying plies, but each time reducing the size thereof so as to leave an endless exposed portion of each ply of the tire casing, until a number of plies have been removed to correspond to the number of plies in the patch, an opening is made in the tire casing, which, when the tire casing is released and returns to normal position, is of the exact shape of the patch. The exposed edge portion of the several plies are then skived to a sharp edge. During this work the tire casing has been firmly held stretched over the head 10 which affords a substantial work support. Although the opening made in the tire casing is greatly distorted while the tire casing is held stretched over the head 10, said opening, when the tire casing is released and returns to its normal shape, assumes the exact shape of the patch to be applied therein.

The patch is then cemented in the opening without spreading the sides of the casing sufficiently to distort the normal shape of the tire casing.

As previously stated, my improved tire spreader is especially well adapted, as illustrated in the drawings, for use in connection with my tire casing turner and work support just described. The tire spreader is illustrated as an entirety by the numeral 24 with the exception of multiplicity of circumferentially spaced radial arms 25 mounted to rotate in a vertical plane, and have at their outer ends pairs of grapples 26 adapted to engage the beads on the sides of a tire casing 27. It may be here stated that the arms 25 are mounted for endwise radial movement, and that the outer grapples 26 are pivotally mounted, whereby when said arms are projected, the grapples 26 will spread the sides of the tire casing 27 which is permitted by the pivotal movement of the outer grapples 26.

The operation of the above described invention may be briefly described as follows:

The tire 27 is first placed between the pairs of grapple arms 26 and said grapple arms hooked over the beads on the sides thereof. The arms 25 are then projected by suitable mechanism which, for the purpose of this case, is not thought necessary to fully illustrate or describe. The tire spreader is then turned on its horizontal axis until the mutilated portion of the tire casing to be repaired is between the two lowermost pairs of grapples 26. Before the sides of the tire casing 27 are spread enough to distort the main body thereof, a patch or pattern 28 is placed in the tire casing 27 over the mutilated portion 29 thereof, and the inside of said casing marked as previously described. The grapple arms 9 are then hooked over the beads on the sides of the tire casing 27 between the two lowermost pairs of grapples 26 which positions the heads 10 directly below the mutilated portion of said tire casing. With the improved tire casing turner and work support thus held suspended from the tire casing 27, the shaft 14 is operated by turning its hand crank to impart an endwise movement to the screw shaft 11 and thereby bring the head 10 into engagement with the tread of the tire 27. A continued movement of said hand crank will cause the head 10 to turn that section of the tire casing 27 between the grapple arms 9 inside out, as shown in Fig. 3.

With the mutilated portion of the tire casing turned inside out and held stretched over the convex head 10, the tire casing is cut and skived to receive a patch as previously described.

The above described invention has, in actual usage, proven highly efficient for the purpose had in view.

What I claim is:

1. An apparatus for use in repairing pneumatic tire casings which includes means for supporting and spreading a tire casing, and independent means for turning a section of the spread tire casing inside out.

2. An apparatus for use in repairing pneumatic tire casings which includes means for supporting and spreading a tire casing, and independent means for turning a section of the spread tire casing inside out, said last noted means affording a work support.

3. An apparatus for use in repairing pneumatic tire casings which includes a plurality of circumferentially spaced supporting grapples adjustable to spread a tire casing, a body, grapples for attaching the body to a tire casing, and means on the body for turning a section of the spread tire casing inside out.

4. A device of the kind described comprising a body, grapples for supporting the body from a tire casing, an endwise movable shaft mounted in the body and having a head for engagement with the tread of the tire, and means for projecting the shaft to turn a section of the tire casing inside out.

5. A device of the kind described comprising a body, grapples for attaching the body to a tire casing, an endwise movable shaft mounted in the body and having a head for engagement with the tread of the tire casing, a gear having screw-threaded engagement with the shaft, means on the body for holding the gear against axial movement but free for rotation, and means for rotating the gear to project the shaft and turn a section of the tire casing inside out.

6. A device of the kind described comprising a body, grapples for attaching the body to a tire casing, an endwise movable shaft mounted in the body and having a head for engagement with the tread of the tire casing, a gear having screw-threaded engagement with the shaft, means on the body for holding the gear against axial movement but free for rotation, and a hand crank-equipped shaft mounted on the body and having a gear meshing with the first noted gear.

7. A device of the kind described comprising a body, a pair of rock shafts journaled on the body, grapples on the rock shafts for supporting the body from a tire casing, an endwise movable shaft mounted in the body and having a head for engagement with the tread of the tire casing, and means for projecting the shaft to turn a section of the tire casing inside out.

8. A device of the kind described comprising a body, a pair of parallel rock shafts journaled on the body, a pair of grapple arms on each rock shaft and having hook-equipped outer ends for engagement with a tire casing to support said body therefrom, an endwise movable shaft mounted in the body and having a head for engagement with the tread of the tire casing, and means for projecting the shaft to turn a section of the tire casing inside out.

In testimony whereof I affix my signature.

PAUL E. HAWKINSON.